US010547829B2

(12) United States Patent
Bae et al.

(10) Patent No.: US 10,547,829 B2
(45) Date of Patent: Jan. 28, 2020

(54) IMAGE DETECTING DEVICE AND IMAGE DETECTING METHOD USING THE SAME

(71) Applicant: Samsung Electronics Co., Ltd., Suwon-si, Gyeonggi-do (KR)

(72) Inventors: Kwanghyuk Bae, Seoul (KR); Chaesung Kim, Seoul (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 152 days.

(21) Appl. No.: 15/623,905

(22) Filed: Jun. 15, 2017

(65) Prior Publication Data

US 2017/0366798 A1    Dec. 21, 2017

(30) Foreign Application Priority Data

Jun. 16, 2016  (KR) ........................ 10-2016-0075316
Jun. 28, 2016  (KR) ........................ 10-2016-0081013
Aug. 26, 2016  (KR) ........................ 10-2016-0109256

(51) Int. Cl.
*H04N 13/25* (2018.01)
*H04N 5/225* (2006.01)
(Continued)

(52) U.S. Cl.
CPC ............. *H04N 13/25* (2018.05); *G01S 17/08* (2013.01); *G06K 9/00597* (2013.01);
(Continued)

(58) Field of Classification Search
CPC .... H04N 13/25; H04N 13/254; H04N 5/2256; H04N 5/2258; H04N 5/23203;
(Continued)

(56) References Cited

U.S. PATENT DOCUMENTS 7,492,390 B2   2/2009   Kaplinsky
8,085,994 B2   12/2011  Kim
(Continued)

FOREIGN PATENT DOCUMENTS

JP    2015-148498 A    8/2015
KR   10-2015-0037628 A   4/2015
(Continued)

*Primary Examiner* — Ayman A Abaza
(74) *Attorney, Agent, or Firm* — Harness, Dickey & Pierce, P.L.C.

(57) ABSTRACT

An image detecting device includes a color image sensor configured to sense visible light and to output color image data based on the sensed visible light; a first infrared lighting source configured to provide first infrared rays to a subject; a second infrared lighting source configured to provide second infrared rays to the subject; a mono image sensor configured to sense a first infrared light or a second infrared light reflected from the subject and output infrared image data; and an image signal processor configured to, measure an illuminance value based on the color image data, measure a distance value of the subject based on a portion of the infrared image data corresponding to the first infrared light, and obtain an identification image of the subject based on the illuminance value, the distance value, and a portion of the infrared image data corresponding to the second infrared light.

20 Claims, 14 Drawing Sheets

(51) Int. Cl.
*H04N 5/235* (2006.01)
*H04N 9/09* (2006.01)
*G06K 9/00* (2006.01)
*G01S 17/08* (2006.01)
*H04N 13/254* (2018.01)

(52) U.S. Cl.
CPC ......... *H04N 5/2256* (2013.01); *H04N 5/2258* (2013.01); *H04N 5/2351* (2013.01); *H04N 5/2353* (2013.01); *H04N 9/09* (2013.01); *H04N 13/254* (2018.05); *G06K 9/00221* (2013.01)

(58) Field of Classification Search
CPC ............. H04N 5/23245; H04N 5/2351; H04N 5/2353; H04N 5/2354; H04N 5/2355; H04N 5/247; H04N 5/332; H04N 9/045; H04N 9/09; G01S 17/02; G01S 17/08; G01S 17/46; G01S 17/89; G06K 9/00221; G06K 9/00597

USPC ......................................................... 348/46
See application file for complete search history.

(56) References Cited

U.S. PATENT DOCUMENTS

| | | | |
|---|---|---|---|
| 8,576,302 | B2 | 11/2013 | Yoshikawa |
| 2006/0192868 | A1 | 8/2006 | Wakamori |
| 2010/0128937 | A1 | 5/2010 | Yoo et al. |
| 2013/0293457 | A1* | 11/2013 | Yoon ...................... G06F 3/011 |
| | | | 345/156 |
| 2014/0160326 | A1 | 6/2014 | Black |
| 2015/0362700 | A1 | 12/2015 | Prabhakar et al. |
| 2016/0260223 | A1* | 9/2016 | Gren ................... G06K 9/00604 |
| 2016/0342836 | A1* | 11/2016 | Hanna ................ G06K 9/00604 |

FOREIGN PATENT DOCUMENTS

| | | |
|---|---|---|
| KR | 10-1554169 B1 | 9/2015 |
| KR | 10-2016-0036762 A | 4/2016 |

* cited by examiner

IMAGE DETECTING DEVICE AND IMAGE DETECTING METHOD USING THE SAME

CROSS-REFERENCE TO RELATED APPLICATIONS

A claim for priority under 35 U.S.C. § 119 is made to Korean Patent Application No. 10-2016-0109256 filed Aug. 26, 2016, in the Korean Intellectual Property Office, the entire contents of which are hereby incorporated by reference.

A claim for priority under 35 U.S.C. § 119 is made to Korean Patent Application No. 10-2016-0075316 filed Jun. 16, 2016, in the Korean Intellectual Property Office, the entire contents of which are hereby incorporated by reference.

A claim for priority under 35 U.S.C. § 119 is made to Korean Patent Application No. 10-2016-0081013 filed Jun. 28, 2016, in the Korean Intellectual Property Office, the entire contents of which are hereby incorporated by reference.

BACKGROUND

1. Field

At least some example embodiments of the inventive concepts disclosed herein relate to an image sensor, and more particularly, to an image detecting device and an image detecting method using the same.

2. Related Art

Digital image capturing devices such as a digital camera and a digital camcorder obtain images by using an image sensor. Nowadays, a smartphone or a personal computer (PC) may obtain an image by using an image sensor arranged on a front surface thereof. The image sensor may include, for example, a charge coupled device (CCD) or a complementary metal-oxide-semiconductor (CMOS) image sensor (CIS).

The image sensor may include a plurality of image sensor pixels. The image sensor pixels may be arranged in the form of an array. The image sensor pixels output analog signals based on light incident thereon. The analog signals output from the image sensor pixels are converted into digital signals, and the digital signals are stored as image data after being digitized.

A recent image sensor is being used as an element of an image detecting device, which detects identification images through face recognition, iris recognize, etc. Also, there is an increasing need to implement two or more functions with one image sensor while satisfying both an image capturing function and a function of exactly detecting an identification image.

SUMMARY

At least some example embodiments of the inventive concepts provide an image detecting device for detecting an identification image with a desirable degree of accuracy and an image detecting method using the same.

An image detecting device includes a color image sensor configured to sense visible light and to output color image data based on the sensed visible light; a first infrared lighting source configured to provide first infrared rays to a subject; a second infrared lighting source configured to provide second infrared rays to the subject; a mono image sensor configured to sense the first infrared light or the second infrared lifht reflected from the subject and output infrared image data based on the sensing of the first infrared light or the second infrared light; and an image signal processor configured to, measure an illuminance value based on the color image data, measure a distance value of the subject based on a portion of the infrared image data corresponding to the first infrared rays, and obtain an identification image of the subject based on the illuminance value, the distance value, and a portion of the infrared image data corresponding to the second infrared rays.

According to at least some example embodiments of the inventive concepts, an image detecting method includes providing first infrared rays to a subject such that the provision of the first infrared rays is synchronized with a sense time of a mono image sensor; generating, at the mono image sensor, infrared image data by sensing the first infrared light reflected from the subject during the synchronized time; measuring a distance between the mono image sensor and the subject based on the infrared image data; and obtaining an identification image of the subject when the measured distance is within a reference range.

According to at least some example embodiments of the inventive concepts, an image detecting device includes a color image sensor; a monochrome image sensor; and an image signal processor configured to determine a distance value of a subject based on first infrared image data generated by the monochrome image sensor in response to first infrared light, determine an illuminance value of the subject based on the distance value and color image data generated by the color image sensor, obtain, based on the determined illuminance value, second infrared image data generated by the monochrome image sensor in response to second infrared light, and obtain the identification image based on the second infrared image data.

BRIEF DESCRIPTION OF THE FIGURES

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

DETAILED DESCRIPTION

Below, at least some example embodiments of the inventive concepts will be described more fully with reference to accompanying drawings.

Figure 1:
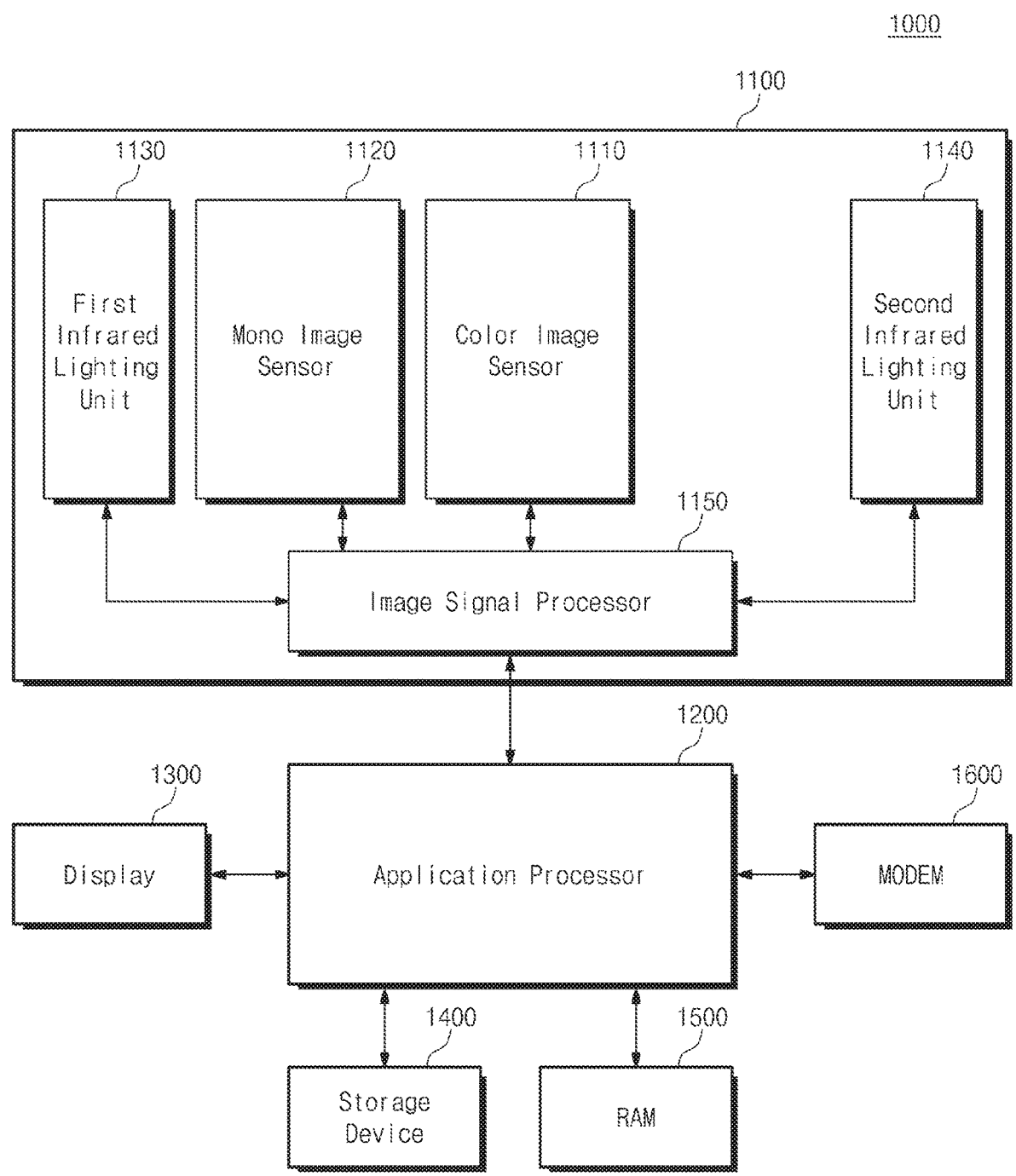
FIG. 1 is a block diagram illustrating an image detecting system, according to at least some example embodiments of the inventive concepts.

FIG. 1 is a block diagram illustrating an image detecting system 1000, according to at least some example embodiments of the inventive concepts. According to at least some example embodiments of the inventive concepts, the image detecting system 1000 may be, or be included in, an electronic device. For example, the image detecting system 1000 may be, or be included in, at least one of a mobile phone, a smartphone, a tablet, a laptop, a smart pad, a smart television, a smart watch, and a wearable device.

Referring to FIG. 1, the image detecting system 1000 includes an image detecting device 1100, an application processor 1200, a display 1300, a storage device 1400, a random access memory (RAM) 1500, and a modem 1600.

The image detecting device 1100 includes a color image sensor 1110, a mono image sensor 1120, a first infrared lighting unit 1130, a second infrared lighting unit 1140, and an image signal processor 1150. As used herein, the term "mono image sensor" may refer to a monochrome image sensor.

The color image sensor 1110 senses visible light, and the mono image sensor 1120 senses infrared light. The color image sensor 1110 outputs color image data CID, and the mono image sensor 1120 outputs infrared image data MID. Detailed contents will be detailed later.

Each of the first infrared lighting unit 1130 and the second infrared lighting unit 1140 provide infrared illumination. The first infrared lighting unit 1130 provides first infrared rays, and the second infrared lighting unit 1140 provides second infrared rays. For example, as is discussed in greater detail below with reference to FIG. 3, the first infrared lighting unit 1130 may include a first infrared light source, and the second infrared lighting unit 1140 may include a second infrared light source.

To measure a distance between a subject and the image detecting device 1100, the mono image sensor 1120 senses first infrared light reflected from the subject. The first infrared light is infrared light reflected from the subject, based on the first infrared rays. The mono image sensor 1120 and the first infrared lighting unit 1130 (e.g., an infrared light source of the first infrared lighting unit 1130) may be arranged adjacent to each other such that the first infrared light reaches the mono image sensor 1120 after the first infrared rays being incident on the subject and the first infrared light being reflected from the subject even in the case where the subject and the image detecting device 1100 are close to each other.

The first infrared lighting unit 1130 may provide the first infrared rays to the subject (e.g., the first infrared lighting unit 1130 may irradiate the subject with the first infrared rays) during a relatively long period of time to measure a distance of the subject in real time. To provide the first infrared rays during a relatively long period of time, the first infrared lighting unit 1130 may provide the first infrared rays to the subject such that the first infrared rays are relatively low power infrared rays.

According to at least some example embodiments of the inventive concepts, the second infrared lighting unit 1140 may be used for operations including any or all of the following: face recognition, iris recognition, and three-dimensional (3D) recognition of a subject. In a low-illuminance environment, to sense the subject, the mono image sensor 1120 senses second infrared light reflected from the subject. The second infrared light is infrared light reflected from the subject, based on the second infrared rays. In the low-illuminance environment such as night or an interior in which a light does not exist, in the case of sensing a part of the subject such as an iris, the second infrared lighting unit 1140 provides the second infrared rays to the subject (e.g., the second infrared lighting unit 1140 irradiates the subject with the second infrared rays). In the case of using the visible light, exact image detection may be difficult due to dazzling. For this reason, the second infrared lighting unit 1140 provides the second infrared rays of the infrared band.

When the second infrared rays are provided to a user wearing glasses for iris recognition, the second infrared light may be reflected from the glasses. When the second infrared lighting unit 1140 (e.g., an infrared light source of the second infrared lighting unit 1140) and the mono image sensor 1120 are arranged adjacent to each other, the second infrared light reflected from the glasses may reach the mono image sensor 1120, thereby making exact image detection difficult. Also, when the second infrared lighting unit 1140 (e.g., an infrared light source of the second infrared lighting unit 1140) and the mono image sensor 1120 are arranged adjacent to each other, the second infrared light may be reflected from capillaries behind the retina, thereby causing the redeye effect. Accordingly, the second infrared lighting unit 1140 (e.g., an infrared light source of the second infrared lighting unit 1140) and the mono image sensor 1120 may be arranged to be spaced apart from each other by a specific distance. According to at least some example embodiments of the inventive concepts, a distance between the first infrared lighting unit 1130 (e.g., an infrared light source of the first infrared lighting unit 1130) and the mono image sensor 1120 may be shorter than a distance between the second infrared lighting unit 1140 (e.g., an infrared light source of the second infrared lighting unit 1140) and the mono image sensor 1120.

According to at least some example embodiments of the inventive concepts, the second infrared lighting unit 1140 may provide the second infrared rays to the subject such that the second infrared rays are relatively high power infrared rays so as to sense the subject at a long distance. For example, the second infrared rays may be provided by the second infrared lighting unit 1140 with a higher level of power than the level of power with which the first infrared rays are provided by the first infrared lighting unit 1130.

The image signal processor 1150 may control the color image sensor 1110, the mono image sensor 1120, the first infrared lighting unit 1130, and the second infrared lighting unit 1140 and may process various data. The image signal processor 1150 may perform various image processing operations based on pieces of data that the color image sensor 1110 and the mono image sensor 1120 provide and may provide the image-processed data to the application processor 1200. As used herein, the terms "piece" or "pieces" used with respect to data refer to units (e.g., portions, fragments, blocks, chunks and/or bytes [e.g., kilobytes KB, megabytes MB, gigabytes GB, etc.]) of data.

The image signal processor 1150 may receive the color image data CID from the color image sensor 1110 and may measure an illuminance value based on the color image data CID. The image signal processor 1150 may measure a distance of the subject based on the infrared image data MID corresponding to the first infrared light from the mono image sensor 1120. The image signal processor 1150 may obtain an identification image of the subject based on the illuminance value, the distance value, and the infrared image data MID corresponding to the second infrared light.

The application processor 1200 may control the image detecting system 1000 and may process various data. The application processor 1200 may execute an operating system and various applications. The application processor 1200 and the image signal processor 1150 are illustrated in FIG. 1 as being separated from each other. However, at least some example embodiments of the inventive concepts are not limited to the example arrangement illustrated in FIG. 1. For example, the application processor 1200 and the image signal processor 1150 may be integrated in one chip.

The display 1300 may receive and display data that is generated by the image detecting device 1100 or data that is stored in the storage device 1400 or the RAM 1500. The display 1300 may be, or include, a display device examples of which include, but are not limited to, a liquid crystal display (LCD), an organic light-emitting diode (OLED) display, an active matrix OLED (AMOLED) display, a flexible display, and an electronic ink display.

According to at least some example embodiments of the inventive concepts, the storage device 1400 may be used as an auxiliary memory of the application processor 1200. For example, source codes of various applications, an operating system executable by the application processor 1200, data generated by the operating system, and/or data generated by applications for long-term storage may be stored in the storage device 1400. The storage device 1400 may be, or include, a storage device examples of which include, but are not limited to, a flash memory, a phase change RAM (PRAM), a magnetic RAM (MRAM), a ferroelectric RAM (FRAM), and a resistive RAM (RRAM).

The RAM 1500 may be used as a main memory of the application processor 1200. For example, the RAM 1500 may store various data processed by the processor 1200 and process codes. According to at least some example embodiments of the inventive concepts, the RAM 1500 may include, for example, one or more of a dynamic RAM (DRAM), a static RAM (SRAM), a PRAM, an MRAM, an FRAM, and an RRAM.

The modem 1600 may communicate with an external device. For example, the modem 1600 may perform communication based one or more of various wireless communication technologies including, for example, long term evolution (LTE), code division multiple access (CDMA), Bluetooth, near field communication (NFC), wireless fidelity (Wi-Fi), and radio frequency identification (RFID), and/or one or more of various wired communication technologies including, for example, universal serial bus (USB), serial AT attachment (SATA), serial peripheral interface (SPI), inter-integrated circuit (I2C), HS-I2C, and integrated-interchip sound (I2S).

Figure 2:
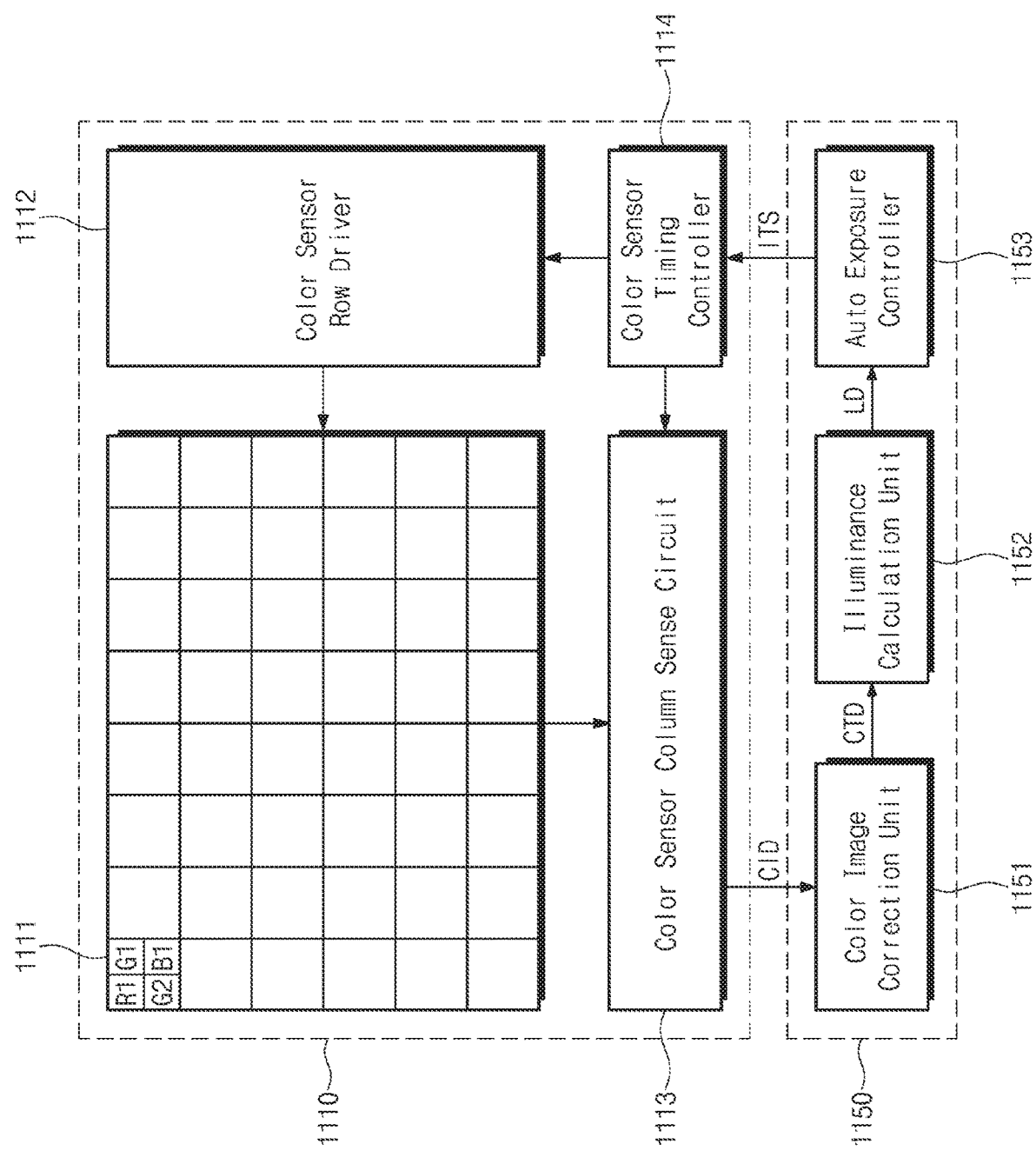
FIGS. 2 and 3 are block diagrams illustrating an image detecting device, according to at least some example embodiments of the inventive concepts.

FIG. 2 is a block diagram illustrating a color image sensor and an image signal processor, according to at least some example embodiments of the inventive concepts.

Referring to FIG. 2, the color image sensor 1110 includes a color pixel array 1111, a color sensor row driver 1112, a color sensor column sense circuit 1113, and a color sensor timing controller 1114. According to at least some example embodiments of the inventive concepts, the color image sensor 1110 may be, for example, a charge coupled device (CCD) image sensor or a complementary metal-oxide-semiconductor (CMOS) image sensor (CIS).

The color pixel array 1111 may include a plurality of pixels. Each pixel may include a plurality of unit pixels. For example, each pixel may include four unit pixels. In detail, each pixel may include a red pixel R1, a first green pixel G1, a second green pixel G2, and a blue pixel B1. Each unit pixel may include a color filter. Unlike that example illustrated in FIG. 2, each pixel of the color pixel array 1111 may be composed of three unit pixels, instead of four. However, at least some example embodiments of the inventive concepts are not limited to pixels each including three or four unit pixels, and each pixel may include less than three or more than four unit pixels. Further, according to at least some example embodiments of the inventive concepts, each unit pixel may include a unit pixel circuit, for example, in accordance with known structures for unit pixel circuits of CCD or CMOS image sensors, and each unit pixel may convert an input light signal into an electrical signal. For example, each unit pixel circuit may convert an input light signal into an electrical signal.

The color sensor row driver 1112 may control an operation of the color pixel array 1111. The color sensor row driver 1112 may generate a row selection signal and may provide the row selection signal to the color pixel array 1111. The color pixel array 1111 may provide an electrical signal from a row, which is selected by the row selection signal, to the color sensor column sense circuit 1113.

The color sensor column sense circuit 1113 senses electrical signals from unit pixels. The color sensor column sense circuit 1113 may convert the electrical signals into the color image data CID by performing an analog-digital conversion operation. The color sensor column sense circuit 1113 provides the color image data CID to the image signal processor 1150.

The color sensor timing controller 1114 may be a circuit or circuitry that controls an operation of the color image sensor 1110. The color sensor timing controller 1114 may drive the color image sensor 1110 by providing control signals to the color sensor row driver 1112 and the color sensor column sense circuit 1113.

According to at least some example embodiments of the inventive concepts, the image signal processor 1150 includes a color image correction unit 1151, an illuminance calculation unit 1152, and an auto exposure controller 1153, each of which may be implemented, for example, by circuitry and/or software or firmware executed by the image signal processor 1150. For example, according to at least some example embodiments of the inventive concepts, the image signal processor 1150 may be or include a microprocessor that executes instructions (e.g., program code included in software or firmware stored in storage accessible by the image signal processor 1150) for implementing the operations of the color image correction unit 1151, illuminance calculation unit 1152, and/or auto exposure controller 1153.

The color image correction unit 1151 receives the color image data CID from the color image sensor 1110 and may generate color thumbnail data CTD by sub-sampling the color image data CID. In detail, the color image correction unit 1151 may generate the color thumbnail data CTD by performing a crop operation and a sub-sampling operation on the color pixel array 1111.

For example, the color image correction unit 1151 may receive the color image data CID corresponding to "1280×720" pixels from the color sensor column sense circuit 1113 and may select the color image data CID corresponding to "1280×704" pixels. Also, the color image correction unit 1151 may selectively receive the color image data CID corresponding to "1280×704" pixels from the color sensor column sense circuit 1113. The color image correction unit 1151 may generate "128×64" pieces of color thumbnail data CTD by sub-sampling each row of the color image data CID corresponding to "1280×704" pixels with a rate of 1/10 and sub-sampling each column thereof with a rate of 1/11. Each of the "128×64" pieces of color thumbnail data CTD may be formed to correspond to four unit pixels: the red pixel R1, the first green pixel G1, the second green pixel G2, and the blue pixel B1.

According to at least some example embodiments of the inventive concepts, power consumption of the image detecting device 1100 may be reduced by generating the color thumbnail data CTD based on the crop operation and the sub-sampling operation.

The illuminance calculation unit 1152 measures an ambient illuminance value based on the color thumbnail data CID generated in the color image correction unit 1151. The illuminance value may be proportional to a sum of luminance values of all pieces of color thumbnail data CTD. That is, the illuminance value is expressed by the following equation.

$$\text{Lux value} = \frac{(AF \times YD)}{(AG \times IT)} \quad \text{[Equation 1]}$$

In Equation 1, "Lux value" indicates the illuminance value, "YD" indicates a luminance value of all pieces of color thumbnail data CTD, "AF" indicates a correction coefficient, "AG" indicates an analog gain, and "IT" indicates an exposure time. The analog gain AG means a gain when the color sensor column sense circuit 1113 performs an analog-digital conversion operation. The exposure time IT means a time when the color pixel array 1111 is exposed to light.

The illuminance calculation unit 1152 provides illuminance data LD to the auto exposure controller 1153 based on the illuminance value. Also, although not illustrated in FIG. 2, the illuminance calculation unit 1152 may provide the illuminance data LD or pieces of color thumbnail data CTD to any other element of the image signal processor 1150 or to the application processor 1200.

The auto exposure controller 1153 may provide an exposure time control signal ITS to the color sensor timing controller 1114 based on the illuminance data LD. For example, a light integration time of unit pixels may decrease as an illuminance value corresponding to the illuminance data LD increases. Accordingly, the auto exposure controller 1153 may control an exposure time by providing the exposure time control signal ITS to the color sensor timing controller 1114.

The image detecting device 1100 according to at least some example embodiments of the inventive concepts may calculate an illuminance value by using the color image sensor 1110 without a separate illuminance sensor. Accordingly, the image detecting device 1100 may make it possible to reduce the number of holes that are provided in the image detecting device 1100 or the image detecting system 1000 for the illuminance sensor.

Figure 3:
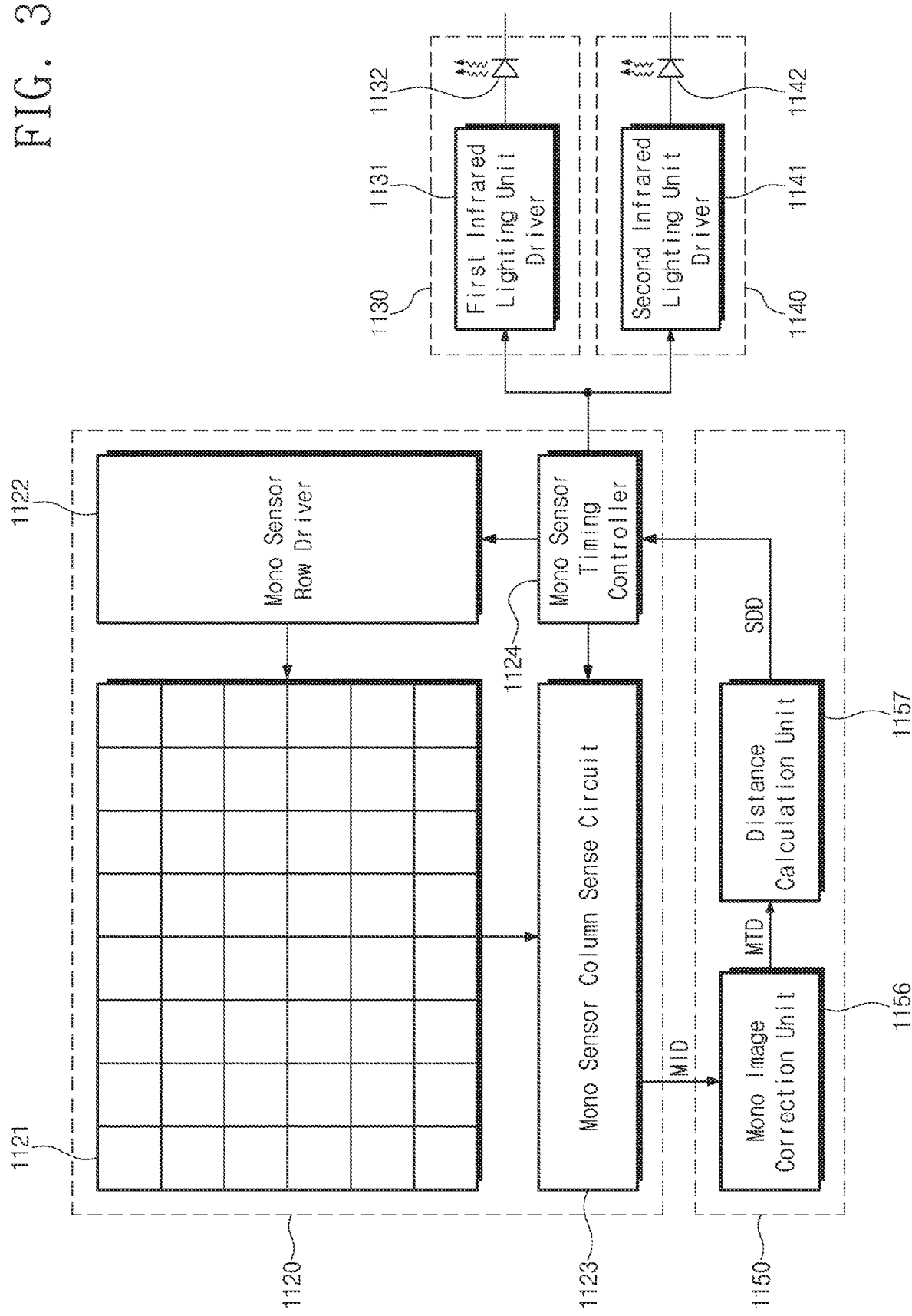
Figure 4:
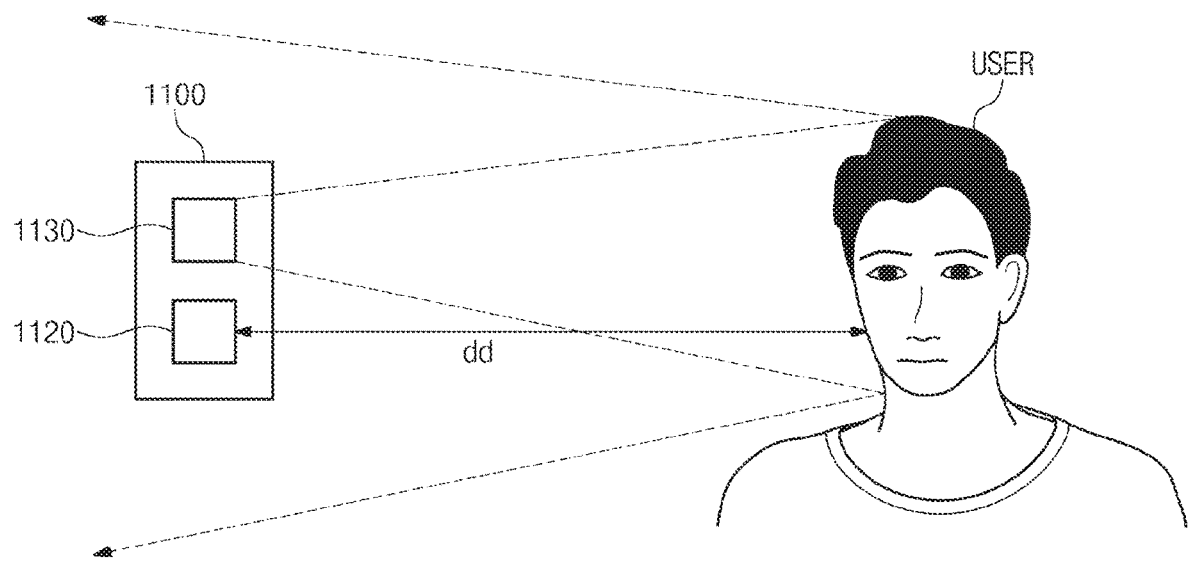
FIG. 4 is a drawing for describing a method of measuring a distance by using a mono image sensor, according to at least some example embodiments of the inventive concepts.

FIG. 3 is a block diagram illustrating a mono image sensor, first and second infrared lighting units, and an image signal processor, according to at least some example embodiments of the inventive concepts. FIG. 4 is a drawing for describing a method of measuring a distance by using a mono image sensor, according to at least some example embodiments of the inventive concepts.

Referring to FIG. 3, the mono image sensor 1120 includes a mono pixel array 1121, a mono sensor row driver 1122, a mono sensor column sense circuit 1123, and a mono sensor timing controller 1124. According to at least some example embodiments of the inventive concepts, the mono image sensor 1120 may be, for example, a CCD image sensor or a CMOS image sensor.

The mono pixel array 1121 may include a plurality of pixels. Unlike the color pixel array 1111, the mono pixel array 1121 may include pixels that sense light of the same band. In detail, each pixel may sense light of an infrared band. The mono sensor array 1121 may include an infrared pass filter. Each pixel may include a pixel circuit, in accordance with known pixel circuits of CCD or CMOS image sensors, that converts an input light signal into an electrical signal.

The mono sensor row driver 1122 may control an operation of the mono pixel array 1121. The mono sensor row driver 1122 may generate a row selection signal and may provide the row selection signal to the mono pixel array 1121.

The mono sensor column sense circuit 1123 senses electrical signals from the mono pixel array 1121. The mono sensor column sense circuit 1123 may convert the electrical signals into infrared image data MID by performing an analog-digital conversion operation. The mono sensor column sense circuit 1123 provides the infrared image data MID to the image signal processor 1150.

The mono sensor timing controller 1124 may control an operation of the mono image sensor 1120. The mono sensor timing controller 1124 may drive the mono image sensor 1120 by providing a control signal to the mono sensor row driver 1122 and the mono sensor column sense circuit 1123. Also, the mono sensor timing controller 1124 drives the first infrared lighting unit 1130 and the second infrared lighting unit 1140 by providing a control signal to a first infrared lighting unit driver 1131 and a second infrared lighting unit driver 1141.

In detail, the mono sensor timing controller 1124 may synchronize a sense time of the mono image sensor 1120 with a time during which the first infrared lighting unit 1130 or the second infrared lighting unit 1140 provides infrared rays. That is, the mono sensor timing controller 1124 may synchronize light driving timing with sensor driving timing to prevent the amount of light practically provided to the mono image sensor 1120 from be measured differently due to a turn-off state of the first infrared lighting unit 1130 or the second infrared lighting unit 1140 while the mono image sensor 1120 sequentially senses light corresponding to mono pixels. Also, the synchronization makes it possible to prevent a rolling shutter phenomenon due to a rapid change in light during a sensing operation of the mono image sensor 1120. Since an illumination providing time of the first infrared lighting unit 1130 or an illumination providing time of the second infrared lighting unit 1140 are synchronized with the sense time of the mono image sensor 1120 by the mono sensor timing controller 1124, there is no need to continuously provide illumination, thereby reducing power consumption.

The image signal processor 1150 includes a mono image correction unit 1156 and a distance calculation unit 1157, each of which may be implemented, for example, by circuitry and/or software or firmware executed by the image signal processor 1150. For example, according to at least some example embodiments of the inventive concepts, the image signal processor 1150 may be or include a microprocessor that executes instructions (e.g., program code included in software or firmware stored in storage accessible by the image signal processor 1150) for implementing the operations of the mono image correction unit 1156 and/or distance calculation unit 1157.

The mono image correction unit 1156 receives the infrared image data MID from the mono image sensor 1120 and may correct the infrared image data MID to generate mono thumbnail data MTD. In detail, the mono image correction unit 1156 may generate the mono thumbnail data MTD by performing a crop operation and a sub-sampling operation on the mono pixel array 1121. Power consumption of the image detecting device 1100 may be reduced by generating the mono thumbnail data MTD based on the crop operation and the sub-sampling operation.

According to at least some example embodiments of the inventive concepts, the mono image sensor 1120 senses the first infrared light or the second infrared light reflected from the subject to output first infrared image data MID1. When the first infrared lighting unit 1130 and the second infrared lighting unit 1140 do not operate, the mono image sensor 1120 senses infrared light reflected from the subject to output second infrared image data MID2.

According to at least some example embodiments of the inventive concepts, the mono image correction unit 1156 may correct the first infrared image data MID1 to generate first thumbnail data MTD1, and the mono image correction unit 1156 may correct the second infrared image data MID2 to generate second thumbnail data MTD2.

The distance calculation unit 1157 may calculate a distance between the subject and the mono image sensor 1120 (i.e., a distance value dd) based on the first mono thumbnail data MTD1 and the second mono thumbnail data MTD2.

The distance calculation unit 1157 may provide distance data SDD to the mono sensor timing controller 1124 based on the distance value dd. Further, although not illustrated in FIG. 3, the distance calculation unit 1157 may provide the distance data SDD or the first and second mono thumbnail data MTD1 and MTD2 to any other element of the image signal processor 1150 or to the application processor 1200. The mono sensor timing controller 1124 may selectively drive the mono image sensor 1120, the first infrared lighting unit 1130, and the second infrared lighting unit 1140 based on the distance data SDD.

The first infrared lighting unit 1130 may include the first infrared lighting unit driver 1131 and a first infrared lighting unit source 1132. The second infrared lighting unit 1140 may include a second infrared lighting unit driver 1141 and a second infrared lighting unit source 1142. The first and second infrared lighting unit sources 1132 and 1142 may be implemented by, for example, infrared (IR) emitters.

The first infrared lighting unit driver 1131 may control driving of the first infrared lighting unit source 1132. The second infrared lighting unit driver 1141 may control driving of the second infrared lighting unit source 1142. Unlike those illustrated in FIG. 3, the first infrared lighting unit driver 1131 and the second infrared lighting unit driver 1141 may be arranged in the image signal processor 1150 or the application processor 1200. Also, the mono sensor timing controller 1124 may drive the first infrared lighting unit 1132 and the second infrared lighting unit 1142 without the first infrared lighting unit driver 1131 and the second infrared lighting unit driver 1141.

Referring to FIG. 4, the first infrared lighting unit 1130 of the image detecting device 1100 provides the first infrared rays to a user. The first infrared rays are incident on the subject. And the first infrared light is reflected from the user. The mono image sensor 1120 senses the reflected first infrared light. The mono image sensor 1120 may measure the distance value dd between the user and the mono image sensor 1120 based on a light intensity Ion of the first infrared light. A distance between the user and the mono image sensor 1120, that is, the distance value dd is expressed by the following equation.

$$dd \propto \left( \frac{RC}{Ion - Ioff} \right)^{0.5} \quad \text{[Equation 2]}$$

Referring to Equation 2, the distance value dd is inversely proportional to a square root of a difference between the light intensity Ion of the reflected first infrared light and the intensity Ioff of light reflected from the user when the first infrared lighting unit 1130 is at an off state. The difference between the light intensity Ion of the first infrared light and the intensity Ioff of light reflected from the user when the first infrared lighting unit 1130 is at an off state may be calculated based on a difference between the first mono thumbnail data MTD1 and the second mono thumbnail data MTD2. A reflection coefficient RC means an amplitude ratio of light incident to the user and light reflected therefrom.

Figure 5:
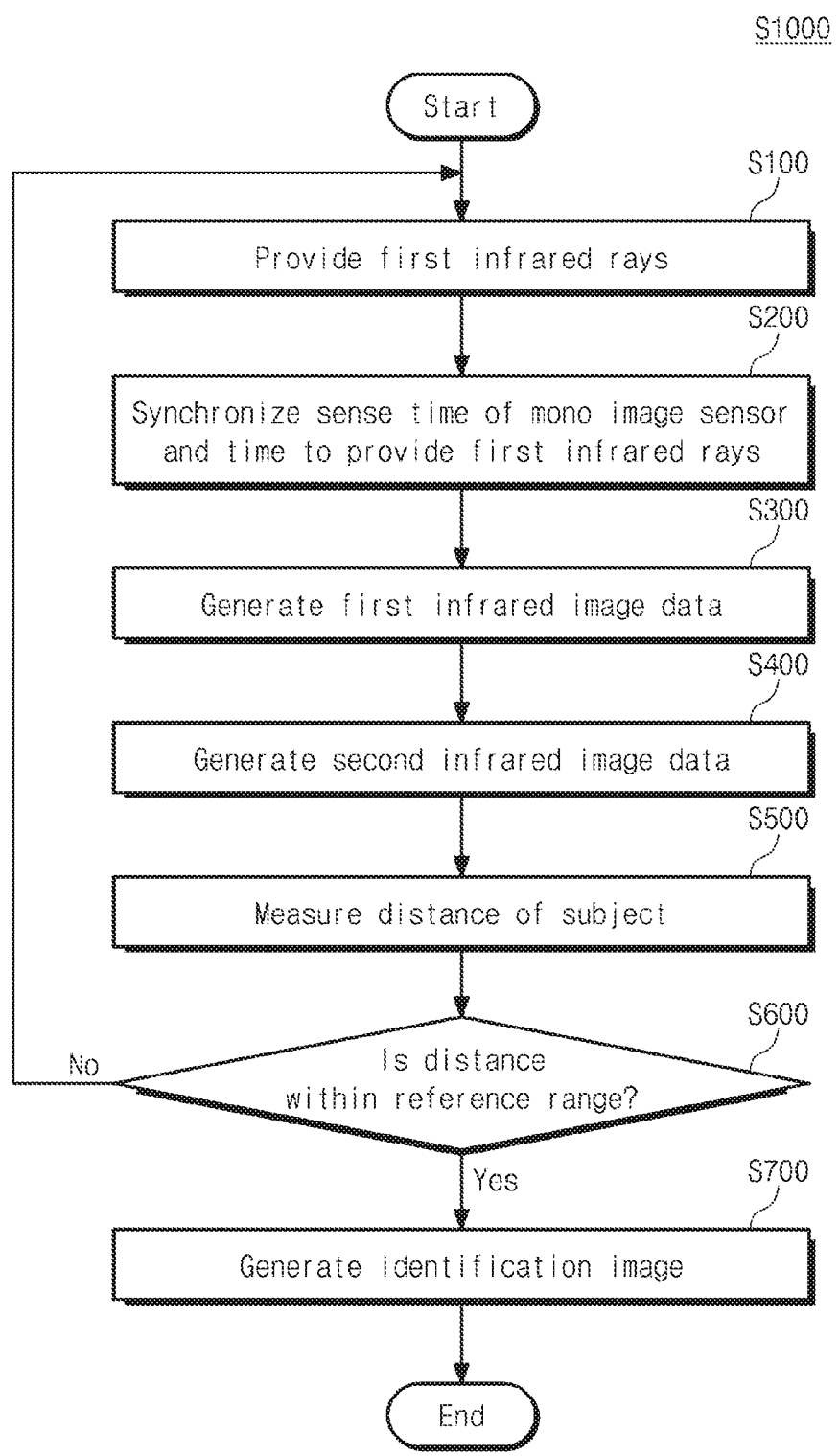
FIGS. 5 and 6 are flowcharts illustrating a method of detecting an image by using an image detecting device, according to at least some example embodiments of the inventive concepts.
Figure 6:
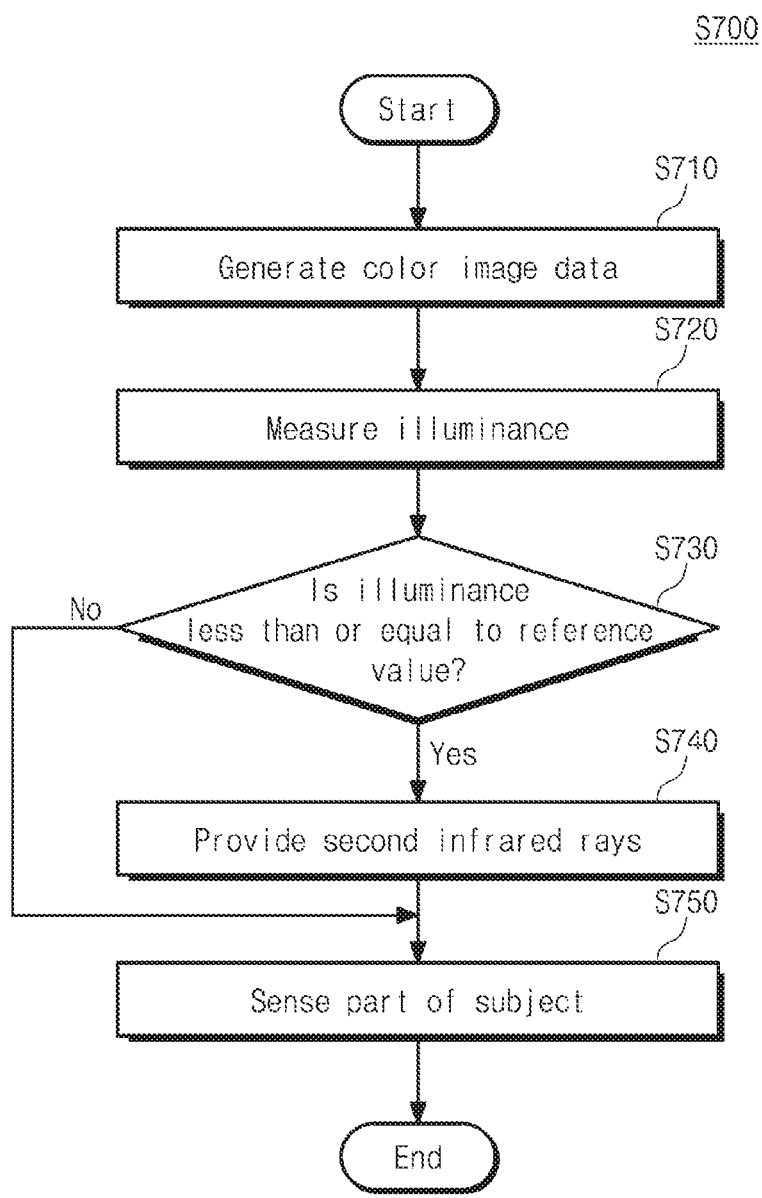

FIG. 5 is a flowchart illustrating a method of detecting an image by using an image detecting device, according to at least some example embodiments of the inventive concepts. FIG. 6 is a flowchart illustrating a method of obtaining an identification image, according to at least some example embodiments of the inventive concepts.

Referring to FIG. 5, a method S1000 of detecting an image by using the image detecting device 1100 includes providing first infrared rays (S100), synchronizing a sense time of a mono image sensor with a time to provide the first infrared rays (S200), generating first infrared image data (S300), generating second infrared image data (S400), measuring a distance of a subject (S500), determining whether the distance of the subject is within a reference range (S600), and obtaining an identification image (S700).

In operation S100, the first infrared lighting unit 1130 provides the first infrared rays to the subject. The first infrared light reach the mono image sensor 1120 after the first infrared rays being incident on the subject and the first infrared light being reflected from the subject.

In operation S200, the mono image sensor 1120 senses the first infrared light reflected from the subject. In this case, as described above, a time to provide the first infrared rays and a sense time of the mono image sensor 1120 may be synchronized to reduce power consumption of the image detecting device 1100, to prevent the rolling shutter phenomenon, and to obtain exact data.

In operation S300, the mono image sensor 1120 senses the first infrared light and/or the second infrared light reflected from the subject to generate the first infrared image data MID1.

In operation S400, the mono image sensor 1120 senses a third infrared light, which are reflected from the subject when the first infrared rays and the second infrared rays are not provided, to generate the second infrared image data MID2.

In operation S500, the image signal processor 1150 measures a distance of the subject based on the first infrared image data MID1 and the second infrared image data MID2. Operation S500 includes correcting the first infrared image data MID1 to generate the first mono thumbnail data MTD1, correcting the second infrared image data MID2 to generate the second mono thumbnail data MTD2, and calculating the distance value dd corresponding to a distance between the subject and the mono image sensor 1120 based on the first mono thumbnail data MTD1 and the second mono thumbnail data MTD2.

In operation S600, the image signal processor 1150 or the application processor 1200 determines whether the distance value dd is within the reference range. For example, the reference range may be set to 20 to 25 cm for iris recognition. For the iris recognition, the distance value dd that is defined such that a diameter of an iris image has a value corresponding to 100 to 200 pixels or more may be the reference range. Also, for face recognition, the reference range may be defined to have about 25 cm or more.

If the distance value dd is not within the reference range, since it may be more difficult to obtain an identification image through the image detecting device 1100 at a distance outside the reference range, the process (i.e., the image detecting device 1100 and/or image detecting system 1000) returns to operation S100 to provide the first infrared rays. The image detecting system 1000 may provide, through the display 1300, a message that allows the user to be placed within the reference range.

If the distance value dd is within the reference range, the process proceeds to operation S700. In operation S700, the mono image sensor 1120 may sense the subject to generate a portion of image data, and the image signal processor 1150 may obtain the identification image based on the portion of the image data.

Referring to FIG. 6, operation S700 includes generating color image data (S710), measuring an illuminance value (S720), determining whether an illuminance value is less than or equal to a reference value (S730), providing second infrared rays (S740), and sensing a part of the subject (S750).

In operation S710, the color image sensor 1110 senses visible light to generate the color image data CID.

In operation S720, the image signal processor 1150 measures the illuminance value based on the color image data CID. Operation S720 includes sub-sampling the color image data CID to generate color thumbnail data and calculating an illuminance value based on the color thumbnail data.

In operation S730, the image signal processor 1150 or the application processor 1200 determines whether the illuminance value is not more than the reference value. A relatively low or, alternatively, minimum brightness for sensing a part of the subject such as user's iris or face may correspond to a reference value of the illuminance value.

If the illuminance value is not more than the reference value, since it may be more difficult for the image detecting device 1100 to sense the subject in a low-illuminance environment, the process (i.e., the image detecting device 1100 and/or image detecting system 1000) proceeds to operation S740. If the illuminance value is greater than the reference value, since it may be easier for the image detecting device 1100 to sense the subject in a higher-illuminance environment, the process (i.e., the image detecting device 1100 and/or image detecting system 1000) proceeds to operation S750 to sense a part of the subject.

In operation S740, the second infrared lighting unit 1140 provides the second infrared rays to the subject (e.g., by irradiating the subject with the second infrared rays). The second infrared light reaches the mono image sensor 1120 after the second infrared rays being incident on the subject and the second infrared light being reflected from the subject. It may be possible to sense the subject in the low-illuminance environment through the second infrared rays.

In operation S750, the mono image sensor 1120 senses the second infrared light reflected from the subject to recognize a part of the subject. The part of the subject may include, but is not limited to, the user's face or iris. The image signal processor 1150 may obtain the identification image based on the part of the subject thus recognized.

Figure 7:
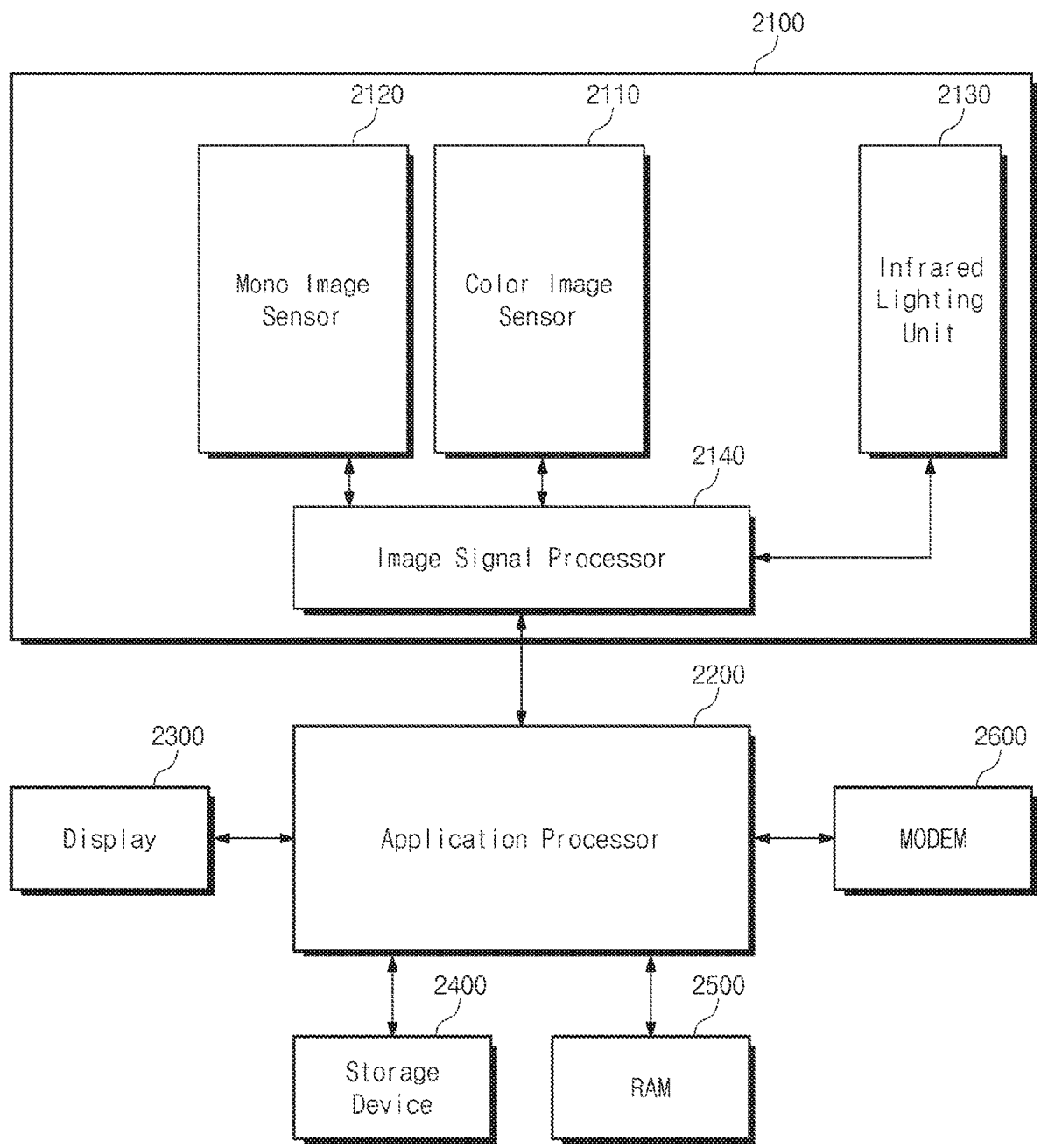
FIG. 7 is a block diagram illustrating an image detecting system, according to at least another example embodiment of the inventive concepts.

FIG. 7 is a block diagram illustrating an image detecting system 2000, according to at least another example embodiment of the inventive concepts.

Referring to FIG. 7, the image detecting system 2000 includes an image detecting device 2100, an application processor 2200, a display 2300, a storage device 2400, a RAM 2500, and a modem 2600. Features and functions of the application processor 2200, the display 2300, the storage device 2400, the RAM 2500, and the modem 2600 are similar to those of corresponding elements of FIG. 1, and a detailed description thereof is thus omitted.

The image detecting device 2100 includes a color image sensor 2110, a mono image sensor 2120, an infrared lighting unit 2130, and an image signal processor 2140.

The color image sensor 2110 senses visible light to generate the color image data CID. The mono image sensor 2120 generates the mono image data MID. As is discussed in greater detail below, the mono image sensor 2120 has an infrared pass mode for sensing infrared light and an infrared cut-off mode for cutting off infrared light.

The infrared lighting unit 2130 provides infrared rays that are incident on, the subject. And the infrared light that is reflected from the subject, based on the infrared rays, reaches the mono image sensor 2120, in the infrared pass mode. FIG. 7 shows one infrared lighting unit 2130. However, at least some example embodiments of the inventive concepts are not limited to an arrangement including only one infrared lighting unit 2130. For example, the infrared lighting unit 2130 may include a plurality of lighting units.

The image signal processor 2140 receives the color image data CID from the color image sensor 2110 and receives the mono image data MID from the mono image sensor 2120. In the infrared cut-off mode, the image signal processor 2140 measures a distance of the subject based on the color image data CID and the mono image data MID. In the infrared pass mode, the image signal processor 2140 may sense a part of the subject based on the mono image data MID by the infrared lighting unit 2130 and may generate an identification image based on the sensed result.

Figure 8:
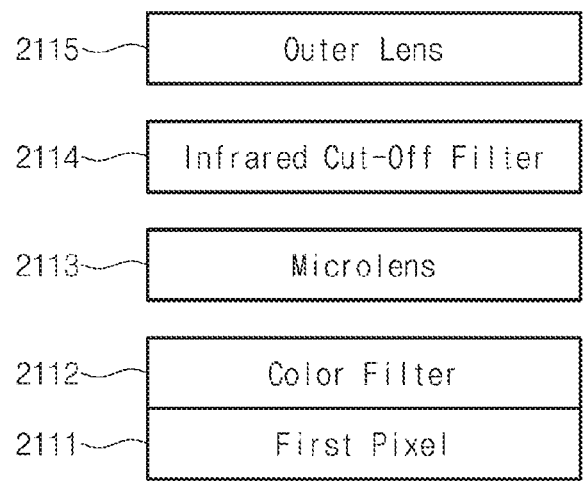
FIGS. 8 and 9 are sectional views of a color image sensor and a mono image sensor.
Figure 9:
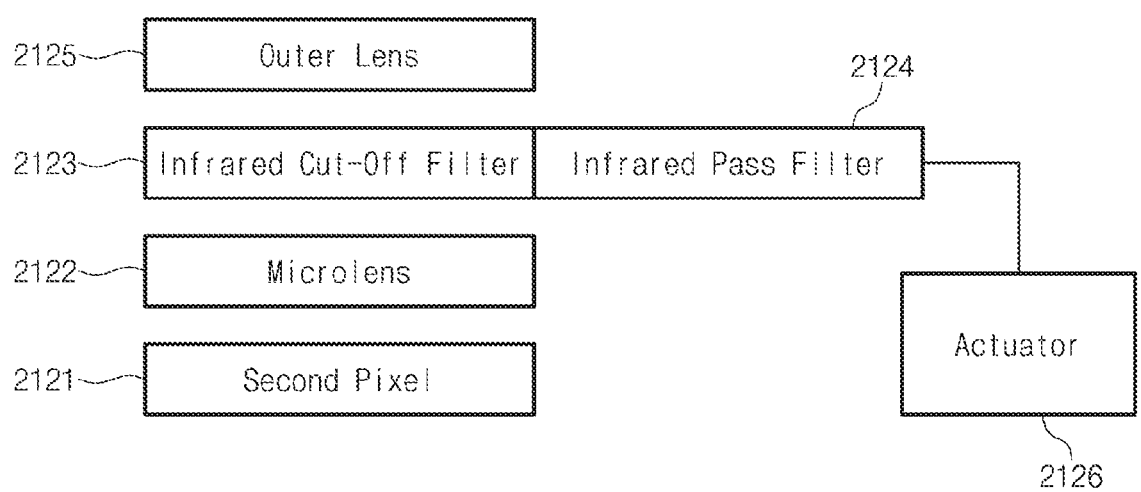

FIG. 8 is a sectional view of the color image sensor 2110 of FIG. 7, and FIG. 9 is a sectional view of the mono image sensor 2120 of FIG. 7.

Referring to FIG. 8, the color image sensor 2110 includes a first pixel 2111, a color filter 2112, a microlens 2113, an infrared cut-off filter 2114, and an outer lens 2115. According to at least some example embodiments of the inventive concepts, the color image sensor 2110 may be, for example, a CCD image sensor or a CMOS image sensor.

Only one first pixel 2111 is illustrated in FIG. 8, but the color image sensor 2110 may include a plurality of first pixels 2111, for example, arranged in a pixel array. The first pixel 2111 may convert an input light signal into an electrical signal. Only one color filter 2112 is illustrated in FIG. 8, but the color image sensor 2110 may include a plurality of color filters 2112. The color filter 2112 passes light of a specific band of a visible band and cuts off light of the rest thereof. The color filter 2112 may be any one of a red color filter, a green color filter, and a blue color filter and may be arranged on the first pixel 2111. Light of a band corresponding to one of red, green, and blue is transmitted to the first pixel 2111 through the color filter 2112. However, at least some example embodiments of the inventive concepts are not limited thereto. For example, light of a band corresponding to one of cyan, magenta, and yellow may be transmitted to the first pixel 2111.

The microlens 2113 may be provided in plurality and the plurality of microlenses may be arranged on the color filter 2112. The microlens 2113 concentrates light incident on the first pixel 2111, thus increasing a sensing effect of the first pixel 2111. The outer lens 2115 refracts light from the subject and may allow an image to be focused in the first pixel 2111.

The infrared cut-off filter 2114 is arranged on the microlens 2113. Since the infrared cut-off filter 2114 cuts off infrared light, noise may be reduced, and color reproduction may be improved. The infrared cut-off filter 2114 may be fixed to the color image sensor 2110.

Referring to FIG. 9, the mono image sensor 2120 includes a second pixel 2121, a microlens 2122, an infrared cut-off filter 2123, an infrared pass filter 2124, an outer lens 2125, and an actuator 2126. According to at least some example embodiments of the inventive concepts, the mono image sensor 2120 may be, for example, a CCD image sensor or a CMOS image sensor.

Only one second pixel 2121 is illustrated in FIG. 9, but the mono image sensor 2120 may include a plurality of second pixels 2121. The second pixel 2121 may convert an input light signal into an electrical signal. Unlike the color image sensor 2110, the mono image sensor 2120 does not include a color filter.

The infrared cut-off filter 2123 and the infrared pass filter 2124 are selectively arranged on or over the second pixel 2121 and the microlens 2122. For example, as is discussed in greater detail below, the image detecting device 2100 may switch, selectively, between arranging the infrared cut-off filter 2123 on or over the second pixel 2121 and arranging the infrared pass filter 2124 on or over the second pixel 2121. The infrared cut-off filter 2123 cuts off infrared light, and the infrared pass filter 2124 passes the infrared light. The infrared pass filter 2124 may be a band-pass filter. The infrared cut-off filter 2123 and the infrared pass filter 2124 may be arranged on the same layer and may be formed to be connected to each other.

The actuator 2126 may allow one of the infrared cut-off filter 2123 and the infrared pass filter 2124 to be arranged over the second pixel 2121. The actuator 2126 may include a motor and may determine a filter to be arranged over the second filter 2121 based on a mode selection signal from the image signal processor 2140.

For example, when the infrared cut-off filter 2123 is arranged over the second pixel 2121, the image detecting device 2100 operates in the infrared cut-off mode. Further, when the infrared pass filter 2124 is arranged over the second pixel 2121, the image detecting device 2100 operates in the infrared pass mode.

Figure 10:
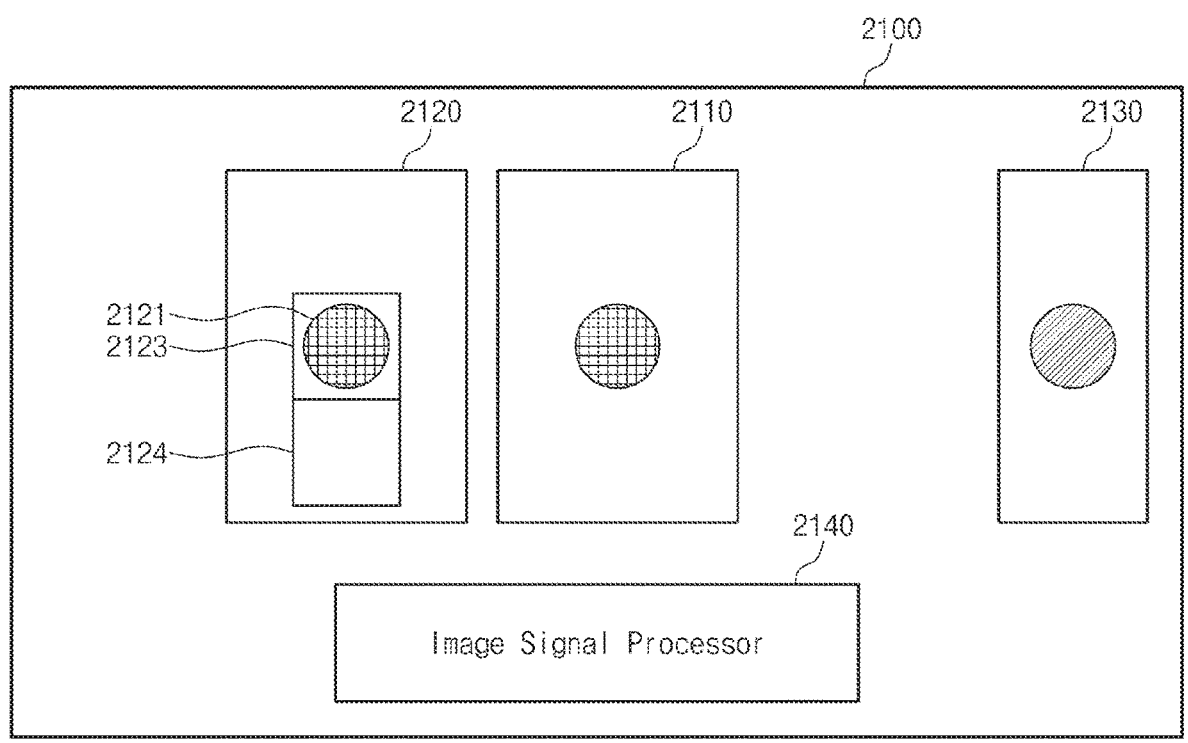
FIG. 10 is a block diagram illustrating an image detecting device in an infrared cut-off mode.
Figure 11:
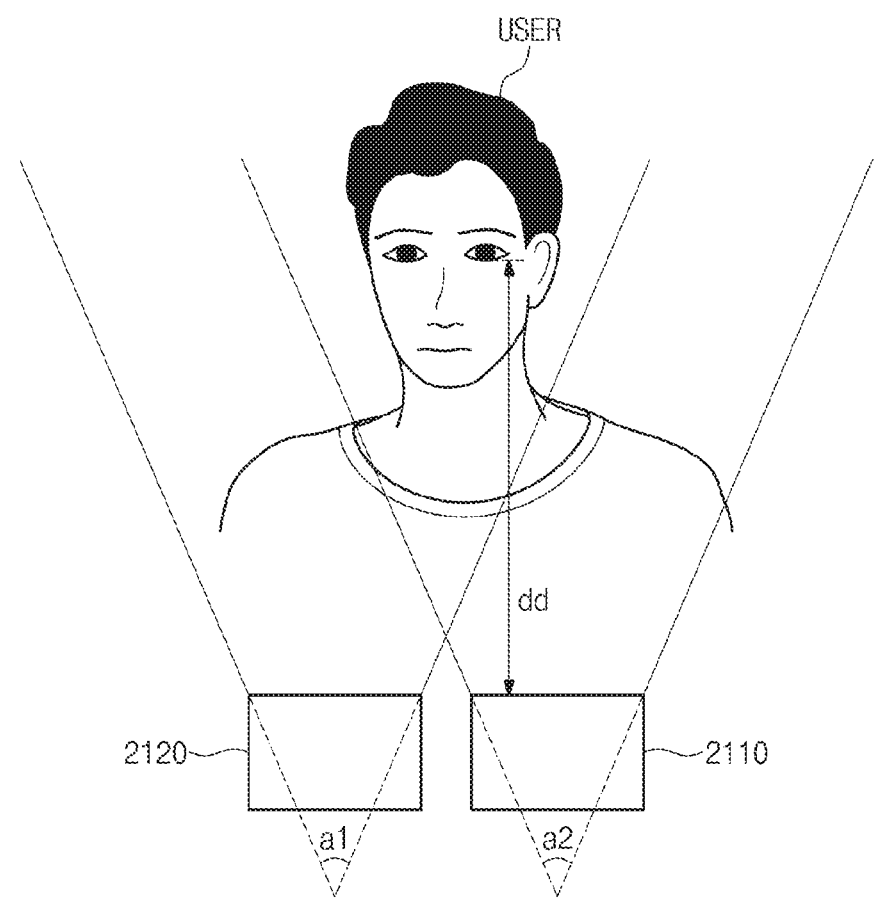
FIGS. 11 and 12 are drawings for describing a method of measuring a distance of a subject in an infrared cut-off mode.
Figure 12:
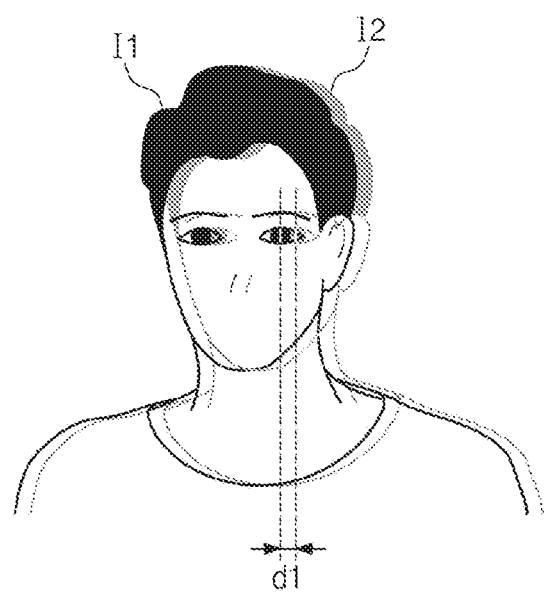

FIG. 10 is a block diagram illustrating an image detecting device in an infrared cut-off mode. FIGS. 11 and 12 are drawings for describing a method of measuring a distance of a subject in an infrared cut-off mode.

Referring to FIG. 10, the infrared cut-off filter 2123 is arranged on or over the second pixel 2121. In this case, the mono image sensor 2120 fails to sense infrared light, and the image detecting device 2100 operates in the infrared cut-off mode. Since it is impossible to sense the infrared light, the infrared lighting unit 2130 is turned off, which is expressed by hatching.

Each of the color image sensor 2110 and the mono image sensor 2120 may sense visible light. The color image sensor 2110 may sense light of a band corresponding to a specific color, for example, through use of a color filter arranged above one or more pixels of the color image sensor 2110, and the mono image sensor 2120 may be viewed as including a white pixel.

Referring to FIG. 11, according to at least some example embodiments of the inventive concepts, the color image sensor 2110 and the mono image sensor 2120 may be spaced apart from each other by a distance. Each of the color image sensor 2110 and the mono image sensor 2120 may sense light reflected from the user. The mono image sensor 2120 may have a first angle of view a1, and the color image sensor 2110 may have a second angle of view a2. The color image data CID sensed by the color image sensor 2110 and the mono image data MID sensed by the mono image sensor 2120 may be matched to measure a distance between the user and the image detecting device 2100. To match the color image data CID and the mono image data MID, the size of an image sensed by the color image sensor 2110 and the size of an image sensed by the mono image sensor 2120 may be equalized. Accordingly, the first angle of view a1 and the second angle of view a2 may have the same value.

Referring to FIG. 12, a first image I1 sensed by the mono image sensor 2120 and a second image I2 sensed by the color image sensor 2110 are matched. The image signal processor 2140 calculates a difference between the first image I1 corresponding to the mono image data MID and the second image I2 corresponding to the color image data CID. The difference may be calculated on the basis of a distance difference d1 between pupils of the images I1 and I2.

In detail, the first image I1 and the second image I2 are different from each other because they are respectively obtained through sensors of which the sense bands are different from each other. However, referring to FIG. 2, the image signal processor 2140 may calculate brightness information of the second image I2 by using the color image data CID sensed by the color image sensor 2110. Also, the image signal processor 2140 may calculate brightness information of the first image I1 based on the mono image data MID. In the case where a separate light does not exist, the user's pupil may belong to a darkest area. The pupil absorbs all light if illumination is not direct light illumination. Accordingly, it may be assumed that an area (or areas) of which the brightness is the lowest corresponds to a user's pupil (or pupils). The image signal processor 2140 may determine areas corresponding to the pupils in the first image I1 and the second image I2 and may calculate the distance difference between the pupils.

The image signal processor 2140 may calculate a distance between the image detecting device 2100 and the user based on the distance difference d1 between the pupils. The distance value may be calculated on the basis of preset calibration information.

Further, according to at least some example embodiments of the inventive concepts, in the infrared cut-off mode, the image signal processor 2140 may improve the quality of an image based on a stereoscopic camera in a low-illuminance environment by using the color image sensor 2110 and the mono image sensor 2120. In the low-illuminance environment, the image signal processor 2140 may improve the quality of image by a combination with the color image data CID by using brightness information of the mono image sensor 2120.

Figure 13:
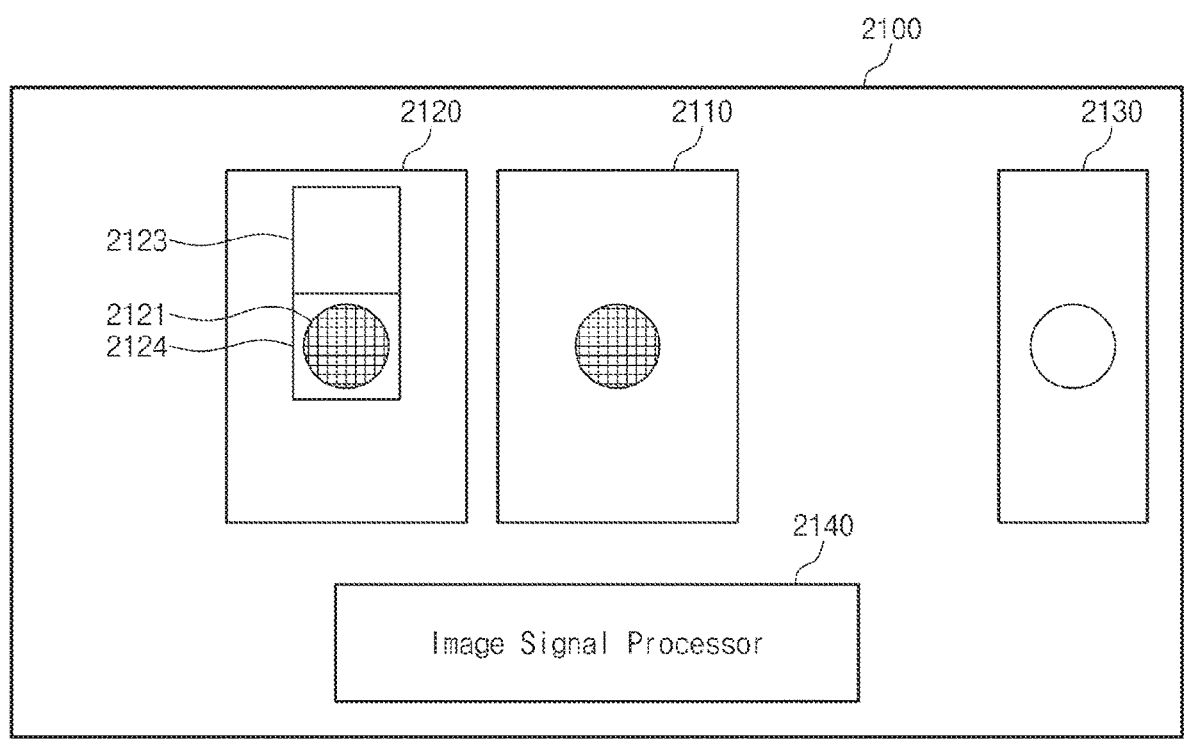
FIG. 13 is a block diagram illustrating an image detecting device in an infrared cut-off mode.

FIG. 13 is a block diagram illustrating the image detecting device 2110 in an infrared pass mode.

Referring to FIG. 13, the infrared pass filter 2124 is arranged on or over the second pixel 2121. In this case, the mono image sensor 2120 may sense infrared light, and the image detecting device 2100 operates in the infrared pass mode. The infrared lighting unit 2130 may be turned on.

The infrared pass mode may be changed from the infrared cut-off mode based on a distance value between the image detecting device 2100 and the subject. For example, for iris recognition, when the distance value is determined such that an iris diameter has at least 100 to 200 pixels, the image signal processor 2140 may switch from the infrared cut-off mode to the infrared pass mode.

The infrared lighting unit 2130 provides infrared rays. The infrared light reaches the mono image sensor 2120 after the infrared rays being incident on the subject and the infrared light being reflected from the subject. The mono image sensor 2120 may sense the subject based on the mono image data MID obtained through the infrared lighting unit 2130. The mono image sensor 2120 may sense the subject by using the infrared lighting unit 2130 even in a low-illuminance environment such as night or a dark interior. However, in the case where a separate light exists, pseudo color image data may be generated by combining the color image data CID obtained through the color image sensor 2110 and the mono image data MID.

Figure 14:
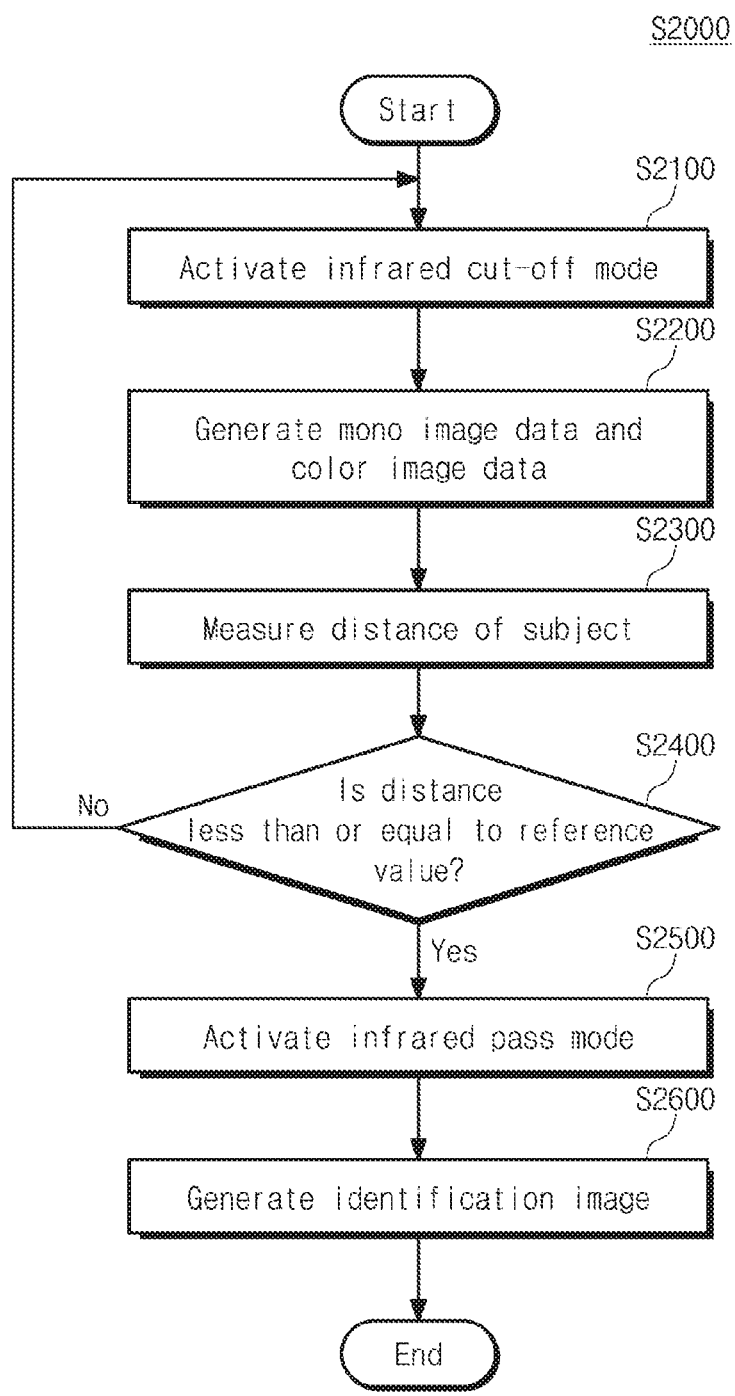
FIG. 14 is a flowchart illustrating a method of detecting an image by using an image detecting device, according to at least another example embodiment of the inventive concepts.

FIG. 14 is a flowchart illustrating a method of detecting an image by using an image detecting device, according to at least another example embodiment of the inventive concepts.

Referring to FIG. 14, a method S2000 of detecting an image by using the image detecting device 2100 includes activating an infrared cut-off mode (S2100), generating mono image data and color image data (S2200), measuring a distance of a subject (S2300), determining whether a distance value of the subject is less than or equal to a reference value (S2400), activating an infrared pass mode (S2500), and generating an identification image (S2600).

In operation S2100, the infrared cut-off filter 2123 is arranged on or over the second pixel 2121. The infrared lighting unit 2130 may be turned on.

In operation S2200, the color image sensor 2110 and the mono image sensor 2120 sense light reflected from the subject. The image signal processor 2140 generates the color image data CID based on an electrical signal received from the color image sensor 2110 and generates the mono image data MID based on an electrical signal received from the mono image sensor 2120.

In operation S2300, the image signal processor 2140 measures a distance of the subject based on the color image data CID and the mono image data MID. Operation S2300 includes matching the color image data CID and the mono image data MID, extracting a difference value between the color image data CID and the mono image data MID, and calibrating the difference value to calculate a distance between the subject and the image detecting device 2100. The difference value may correspond to, for example, a disparity between an image corresponding to the color image data CID and an image corresponding to the mono image data MID.

In operation S2400, the image signal processor 2140 or the application processor 2200 determines whether the distance between the subject and the image detecting device 2100 is not more than a reference value. For example, the reference range may be set to 20 to 25 cm for iris recognition.

If the distance, that is, the distance value dd is greater than the reference value, it is difficult to recognize a part of the subject. In this case, the process proceeds to operation S2100 to maintain the infrared cut-off mode. The image detecting system 2000 may provide, through the display 2300, a message that allows the user to be placed within a reference range.

If the distance value dd is not more than the reference value, the process proceeds to operation S2500 to activate the infrared pass mode. In operation S2500, the infrared pass filter 2124 is arranged on or over the second pixel 2121. The infrared lighting unit 2130 may be turned on. The infrared lighting unit 2130 may provide infrared rays to the subject. The infrared light reaches the mono image sensor 2120 after the infrared rays being incident on the subject and the infrared light being reflected from the subject. The infrared rays may make it possible to sense the subject in the low-illuminance environment.

In operation S2600, the mono image sensor 2120 senses the second infrared light reflected from the subject to recognize a part of the subject. The part of the subject may include, but not limited to, user's face or iris. The image signal processor 2140 obtains the identification image based on the sensed subject. Also, the image signal processor 2140 may improve the quality of image by a combination with the color image data CID obtained through color image sensor 2110.

Figure 15:
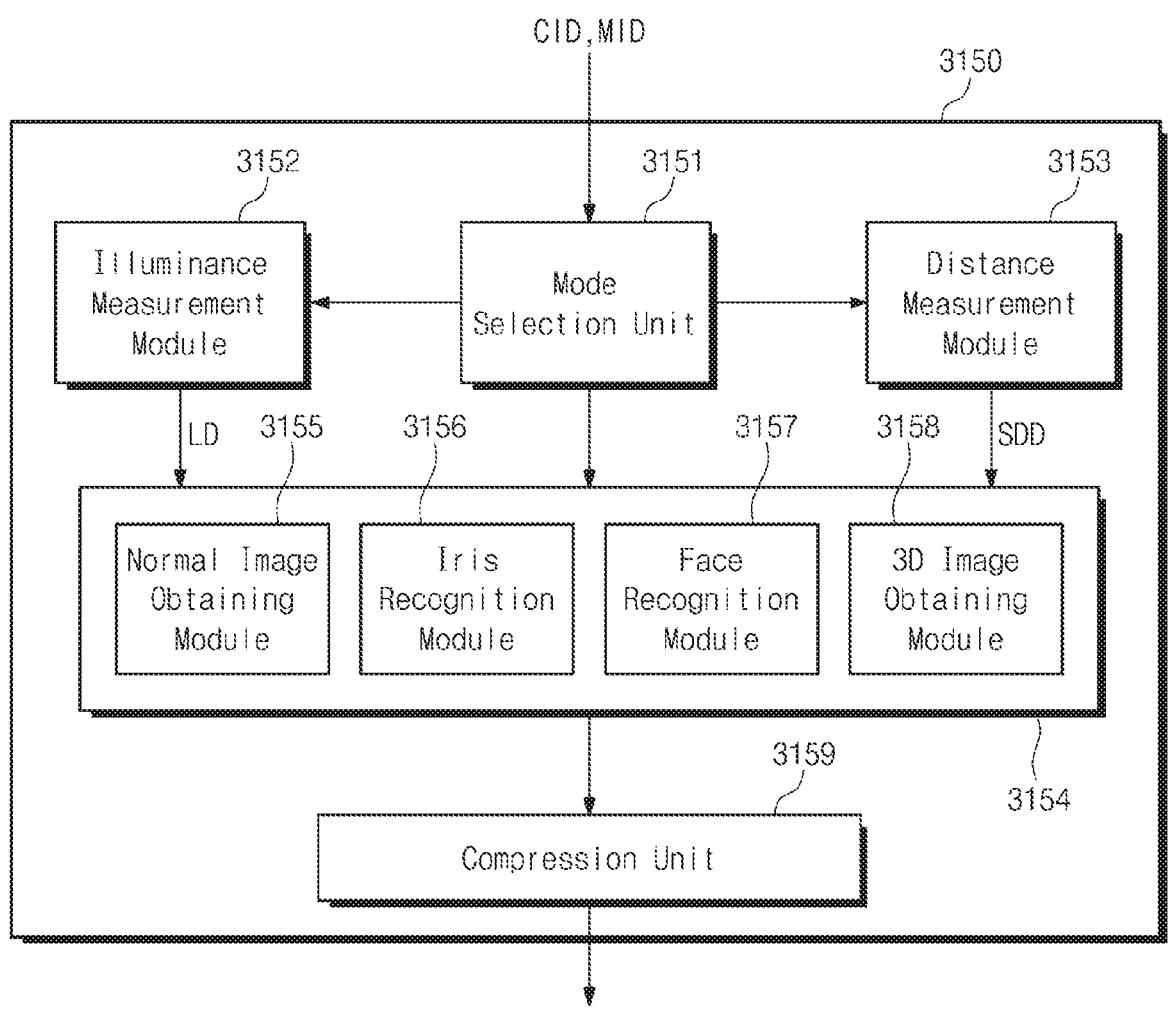
FIG. 15 is a block diagram illustrating an image signal processor, according to at least some example embodiments of the inventive concepts.

FIG. 15 is a block diagram illustrating an image signal processor 3150, according to at least some example embodiments of the inventive concepts. The image signal processor 3150 of FIG. 15 may be an example implementation of the image signal processor 1150 included in the image detecting device 1100 of FIG. 1 and/or the image signal processor 2140 included in the image detecting device 2100 of FIG. 7.

Referring to FIG. 15, the image signal processor 3150 may include a mode selection unit 3151, an illuminance measurement unit 3152, a distance measurement module 3153, an image obtaining module 3154, and a compression unit 3159 each of which may be implemented, for example, by circuitry and/or software or firmware executed by the image signal processor 3150. The image obtaining module 3154 may include a normal image obtaining module 3155, an iris recognition module 3156, a face recognition module 3157, and a three-dimensional (3D) image obtaining module 3158 each of which may be implemented, for example, by circuitry and/or software or firmware executed by the image signal processor 3150. According to at least some example embodiments of the inventive concepts, the image signal processor 3150 may be or include a microprocessor that executes instructions (e.g., program code included in software or firmware stored in storage accessible by the image signal processor 3150) for implementing the operations of the mode selection unit 3151, illuminance measurement unit 3152, distance measurement module 3153, image obtaining module 3154, compression unit 3159, normal image obtaining module 3155, iris recognition module 3156, face recognition module 3157, and/or three-dimensional (3D) image obtaining module 3158. The mode selection unit 3151 receives the color image data CID or the infrared image data (mono image data) MID. The mode selection unit 3151 may provide the received data to one of the illuminance measurement module 3152, the distance measurement module 3153, and the image obtaining module 3154. The module selection unit 3151 may include a switch and may be selectively connected to each module of the image signal processor 3150.

The mode selection unit 3151 may determine an illuminance measurement mode for measuring an illuminance value Lux value, a distance measurement mode for measuring a distance value dd, an identification image detection mode for obtaining the identification image, and a normal image detection mode for obtaining the color image data CID. Also, the identification image detection mode may include an iris recognition mode for recognizing an iris of the user, a face recognition mode for recognizing a face of the user, and a 3D image obtaining mode using a dual image sensor.

The infrared cut-off mode of FIG. 10 may correspond to the normal image detection mode in the case of improving the quality of image and may correspond to the distance measurement mode in the case of measuring a distance. The infrared pass mode of FIG. 13 may correspond to the identification image detection mode.

In the illuminance measurement mode, the mode selection unit 3151 is connected with the illuminance measuring module 3152. The illuminance measurement module 3152 may include the color image correction unit 1151, an illuminance calculation unit 1152, and the auto exposure controller 1153 of FIG. 2 and may output illuminance data LD by using the color image data CID. When an illuminance value is not more than a reference value, the second infrared lighting unit 1140 of FIG. 1 or the infrared lighting unit 2130 of FIG. 7 may be activated. In this case, the mode selection unit 3151 may switch to the identification image detection mode to recognize iris, face, 3D image, etc. Alternatively, the mode selection unit 3151 may switch to the distance measurement mode to secure a distance value of the subject that is set to a desirable value or, alternatively, optimized for recognition of the identification image.

In the distance measurement mode, the mode selection unit 3151 transfers the color image data CID or the infrared image data (mono image data) MID to the distance measurement module 3153. The distance measurement module 3153 may include the mono image correction unit 1156 and the distance calculation unit 1157 of FIG. 3, and may calculate the distance value dd by using the infrared image data MID. Alternatively, the distance measurement module 3153 may measure the distance value dd by matching the color image data CID and the mono image data MID in the infrared cut-off mode of FIG. 10. The distance measurement module 3153 may measure the distance value dd to output distance data SDD. If the distance value dd is within a reference range, the mode selection unit 3151 may switch to the identification image detection mode.

In the normal image detection mode, the mode selection unit 3151 transfers the color image data CID or the infrared image data (mono image data) MID to the normal image obtaining module 3155. The normal image obtaining module 3155 receives the color image data CID and outputs normal image. In this case, the quality of image may be improved based on brightness information of the mono image data MID.

In the iris recognition mode, the mode selection unit 3151 transfers the color image data CID or the infrared image data (mono image data) MID to the iris recognition module 3156 and may recognize the iris of the user. The iris recognition module 3156 performs a method of recognizing a part of the subject, according to at least some example embodiments of the inventive concepts. In the face recognition mode, the mode selection unit 3151 transfers the color image data CID or the infrared image data (mono image data) MID to the face recognition module 3157 and may recognize the face of the user. The face recognition module 3157 performs a method of recognizing a part of the subject, according to at least some example embodiments of the inventive concepts. In the 3D image obtaining module, the mode selection unit 3151 transfers the color image data CID or the infrared image data (mono image data) MID to the 3D image obtaining module 3158 and obtains a 3D image by using the mono image sensor 1120 or 2120 and the color image sensor 1110 or 2110.

The compression unit 3519 compresses an image obtained by the image obtaining module 3154 and provides the compressed image to the application processor 1200 or 2200. In detail, the compressed image may be stored in the storage device 1400 or 2400 and may be displayed in the display 1300 or 2300.

According to at least some example embodiments of the inventive concepts, as an illuminance value and a distance of a subject are measured without a separate sensor, an identification image may be exactly detected.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. An image detecting device comprising:
a color image sensor configured to sense visible light and to output color image data based on the sensed visible light;
a first infrared lighting source configured to provide first infrared rays to a subject;
a second infrared lighting source configured to provide second infrared rays to the subject;
a mono image sensor configured to,
sense a first infrared light reflected from the subject based on the first infrared rays, a second infrared light reflected from the subject based on the second infrared rays, and a third infrared light reflected from the subject when the first infrared rays and the second infrared rays are not being provided by the first and second infrared lighting sources, and output first infrared image data based on the sensing of the first infrared light, second infrared image data based on the sensing of the second infrared light, and third infrared image data based on the sensing of the third infrared light; and an image signal processor configured to, measure an illuminance value based on the color image data, measure a distance value of the subject based on a difference between first data correcting the first infrared image data and second data correcting the third infrared image data, and obtain an identification image of the subject based on the illuminance value, the distance value, and the second infrared image data.

2. The image detecting device of claim 1, wherein the image signal processor is configured to activate the second infrared lighting source when the illuminance value is less than or equal to a reference value.

3. The image detecting device of claim 2, wherein the image signal processor is configured to obtain the identification image when the distance value is within a reference range.

4. The image detecting device of claim 3, wherein the identification image includes an iris image.

5. The image detecting device of claim 4, wherein image signal processor is configured such that the reference range is defined as values of the distance value for which a diameter of the iris image corresponds to 100 pixels or more.

6. The image detecting device of claim 1, wherein the image signal processor is configured to, generate color thumbnail data by correcting the color image data;

calculate the illuminance value based on the color thumbnail data; and control an exposure time of the color image sensor based on the illuminance value.

7. The image detecting device of claim 1, wherein the image signal processor is configured to, generate first mono thumbnail data being the first data by cropping and sub-sampling the first infrared image data, and generate second mono thumbnail data being the second data by cropping and sub-sampling the second infrared image data corresponding to third infrared light, and measure the distance value by calculating a distance between the subject and the mono image sensor based on a difference between the first mono thumbnail data and the second mono thumbnail data.

8. The image detecting device of claim 1, wherein the mono image sensor comprises:

a mono sensor timing controller configured to synchronize a time to provide the first infrared rays or the second infrared rays with a sense time of the mono image sensor.

9. The image detecting device of claim 8, further comprising:

a first infrared lighting driver configured to drive the first infrared lighting source in response to a control signal from the mono sensor timing controller; and a second infrared lighting driver configured to drive the second infrared lighting source in response to the control signal from the mono sensor timing controller.

10. The image detecting device of claim 1, wherein a distance between the first infrared lighting source and the mono image sensor is smaller than a distance between the second infrared lighting source and the mono image sensor.

11. The image detecting device of claim 1, wherein power consumption of the first infrared lighting source is smaller than power consumption of the second infrared lighting source.

12. The image detecting device of claim 1, wherein the image signal processor is configured to, determine one of an illuminance measurement mode for measuring the illuminance value, a distance measurement mode for measuring the distance value, an identification image detection mode for obtaining the identification image by sensing a part of the subject, and a normal image detection mode for obtaining the color image data, and change the distance measurement mode to the identification image detection mode when the distance value is within a reference range in the distance measurement mode.

13. The image detecting device of claim 12, wherein the image signal processor is configured such that the identification image detection mode includes an iris recognition mode, a face recognition mode, and a three-dimensional (3D) image obtaining mode.

14. The image detecting device of claim 12, wherein the image signal processor is configured to change the illuminance measurement mode to the identification image detection mode when the illuminance value is more than a reference value in the illuminance measurement mode.

15. The image detecting device of claim 1, wherein the image signal processor is configured to calculate the illuminance value based on a sum of luminance values of all pieces of color thumbnail data generated by correcting the color image data.

16. An image detecting device comprising:

a color image sensor;

a monochrome image sensor;

a first infrared light source configured to irradiate a subject with first infrared rays; and an image signal processor configured to, generate first infrared image data in response to first infrared light incident on the monochrome image sensor, the first infrared light being light reflected from the subject based on the first infrared rays, generate second infrared image data in response to second infrared light incident on the monochrome image sensor, the second infrared light being light reflected from the subject when the first infrared light source is in an off state, determine a light intensity difference between an intensity of the first infrared light and an intensity of the second infrared light based on the first and second infrared image data, determine a distance value of a subject based on the determined light intensity difference, determine an illuminance value of the subject based on the distance value and color image data generated by the color image sensor, obtain, based on the determined illuminance value, third infrared image data generated by the monochrome image sensor in response to third infrared light, and obtain an identification image based on the third infrared image data.

17. The image detecting device of claim 16, further comprising:
a second infrared light source configured to irradiate the subject with third infrared rays.

18. The image detecting device of claim 17, wherein the image signal processor is configured to activate the second infrared light source when the determined illuminance value is less than or equal to a reference value.

19. The image detecting device of claim 16, wherein the color image sensor is configured to generate the color image data in response to light that is reflected from the subject and incident on the color image sensor.

20. The image detecting device of claim 17, wherein the third infrared light is light reflected from the subject based on the third infrared rays.

* * * * *